(12) United States Patent
Lycan

(10) Patent No.: US 6,505,410 B1
(45) Date of Patent: Jan. 14, 2003

(54) WELD GAUGE

(75) Inventor: Goodwin A. Lycan, Bridgman, MI (US)

(73) Assignee: G.A.L. Gage Co., Stevensville, MI (US)

( * ) Notice: Subject to any disclaimer, the term of this patent is extended or adjusted under 35 U.S.C. 154(b) by 29 days.

(21) Appl. No.: 09/657,032

(22) Filed: Sep. 7, 2000

(51) Int. Cl.$^7$ ................................................ B43L 13/00
(52) U.S. Cl. ........................ 33/473; 33/1 N; 33/1 SD; 33/465; 33/471
(58) Field of Search .................... 33/832, 833, 834, 33/613, 645, 679.1, 1 N, 1 C, 1 SB, 1 SA, 1 SD, 1 R, 424, 470, 452, 464, 465, 471, 472, 473

(56) References Cited

U.S. PATENT DOCUMENTS

| | | |
|---|---|---|
| 2,389,842 A | 11/1945 | Cummins |
| 3,597,848 A | 8/1971 | Matson |
| 4,165,566 A | 8/1979 | Lycan |
| 4,485,558 A | 12/1984 | Lycan et al. |
| 4,497,115 A | 2/1985 | Dearman |
| 4,545,124 A | 10/1985 | Brooks |
| 4,637,142 A | 1/1987 | Baker |
| 4,702,012 A | * 10/1987 | Miller ........................ 33/464 |
| 4,924,580 A | 5/1990 | Garafalo et al. |
| 5,465,498 A | 11/1995 | Lycan |
| 5,611,149 A | * 3/1997 | Fujiwara ...................... 33/833 |
| 5,915,806 A | * 6/1999 | Levee ........................... 33/42 |

FOREIGN PATENT DOCUMENTS

JP        363167201 A   *  7/1988   ................. 33/555.1

OTHER PUBLICATIONS

G.A.L. Gage Co., Catalog 4, Oscars Printing, St. Joseph Michigan, USA No Date.
Photocopy of Welding Institutute UK Gauge No Date.

* cited by examiner

*Primary Examiner*—Diego Gutierrez
*Assistant Examiner*—Travis Reis
(74) *Attorney, Agent, or Firm*—James D. Hall; Ronald D. Foster

(57) ABSTRACT

An adjustable gauge having special attention to measuring the dimensions of a fillet weld. The gauge includes a first plate that is rectangular in shape and terminates in an edge which transverses one corner, and a second plate that is circular in shape. The front face of the first plate has a recess therein sized to accommodate the second plate, wherein the plates are rotatably mounted about an axis of rotation and juxtaposed to one another. The gauge also indicates a linear member slidably mounted along the same axis of rotation as the first and second plates upon the second plate. The linear member is extendible in relation to the second plate so as to measure the dimension of the weld.

12 Claims, 4 Drawing Sheets

WELD GAUGE

FIELD OF THE INVENTION

This invention relates to an adjustable gauge, and more particularly to an adjustable gauge that has special application in measuring or checking the dimensions of a fillet weld and may also be used for making several other workpiece measurements.

BACKGROUND OF INVENTION

Fillet welds are used when it is desired to join together two metal plates usually located at right angles relative to each other, but of course as one skilled in the art knows, the plates to be joined may be placed at an angle of more or less than 90°. Heretofore, many of the gauges used to determine dimensions of these types of welds have not been accurate, and many separate gauges were required to check various sizes of welds. Some prior art fillet gauges also require that the fillet scale be disengaged from the main body and flipped over in order to measure alternate dimensional scales. In U.S. Pat. No. 2,389,842, presized corner templates are used to gauge fillet welds. In U.S. Pat. No. 3,597,848 a separate steel member must be utilized to read the gauge. Improvements have been made in the area of weld gauges, and gauges now exist that can perform multiple measurements. Examples are disclosed in U.S. Pat. Nos. 4,485,558, and 4,637,142.

However, the need continues for a more accurate and easier to use weld gauge. Accordingly, it is an object of this invention to provide for a novel, adjustable gauge for measuring the dimensions of a fillet weld. It is also an object of the invention to provide a weld gauge that has multiple scales and is easy to read.

Another object of this invention is to provide a fillet weld gauge which may be used to rapidly measure many different sizes of welds without the need for disengaging the fillet scale and flipping said scale over the measure alternate dimensional scales.

Another object of the invention is to provide for a fillet weld gauge which is readily adjustable and accurate.

Other objects of the invention will become apparent upon the reading of the following description.

SUMMARY OF INVENTION

The objects of the invention have been accomplished by providing an adjustable gauge having special application to the measuring of the dimensions of fillet weld. The gauge is accurate and easy to use. The gauge includes a first plate and a second plate whereas the plates are rotatably mounted about an axis of rotation and juxtaposed to each other, and a linear member rotatably mounted on the same axis of rotation as the first and second plates juxtaposed to the second plate on a first face opposite the first plate, the linear member further member being slidably mounted in relation to the first and second plates in order to extend so as to measure a dimension of a weld.

Another feature of the invention is that the first plate is substantially rectangular in shape and terminates in an edge which traverses one corner thereof. The second plate is substantially circular in shape. The face of the first plate, which is adjacent to the second plate, has a recess thereon sized to accommodate the second plate.

Also, a feature of the invention is that the first plate, the second plate, and the linear member are rotatably mounted with a spring loaded mechanism for varying the rotational resistant there between. The second plate has first linear groove in the first face which the linear member slides in to measure the dimensions of a fillet weld. A second linear groove is located in the first face of the second plate set at an angle to the first groove for purposes of alternately sliding the linear member therein and measuring the dimensions of the weld using an alternative scale.

An additional feature of the invention is the weld gauge is provide with third a plate rotatably mounted to the first plate and juxtaposed against a back face of the first plate opposite the face to which the second plate is mounted.

A further feature of the invention is that the third plate is shaped substantially in the form of a pie section and rotatably mounted to the first plate in an area coinciding with the center of said pie.

Lastly it is a feature of the invention that the weld gauge has a detent mechanism for providing a rotational stopping points of the second plate in relation to the first plate. The detent mechanism comprises rounded protrusions on either the first plate or the second plate and mating apertures in the other juxtaposed plate corresponding to the desired rotational stopping points.

DESCRIPTION OF THE PREFERRED EMBODIMENT

Figure 5:
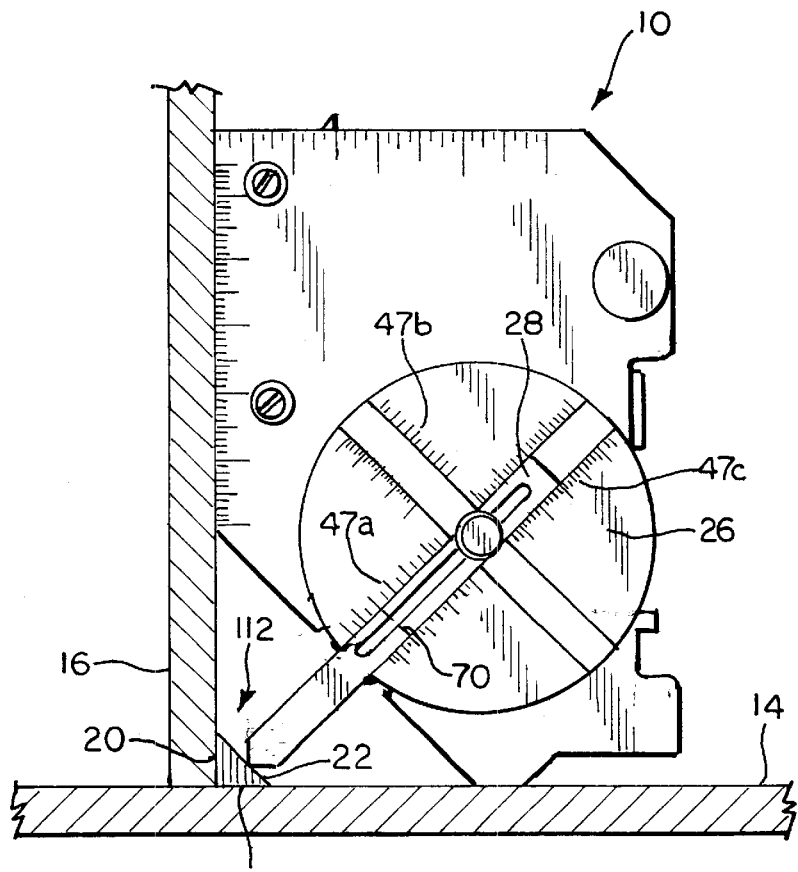
FIG. 5 is a perspective view of the gauge shown as measuring the throat of fillet weld using the English or inch scale.
Figure 6:
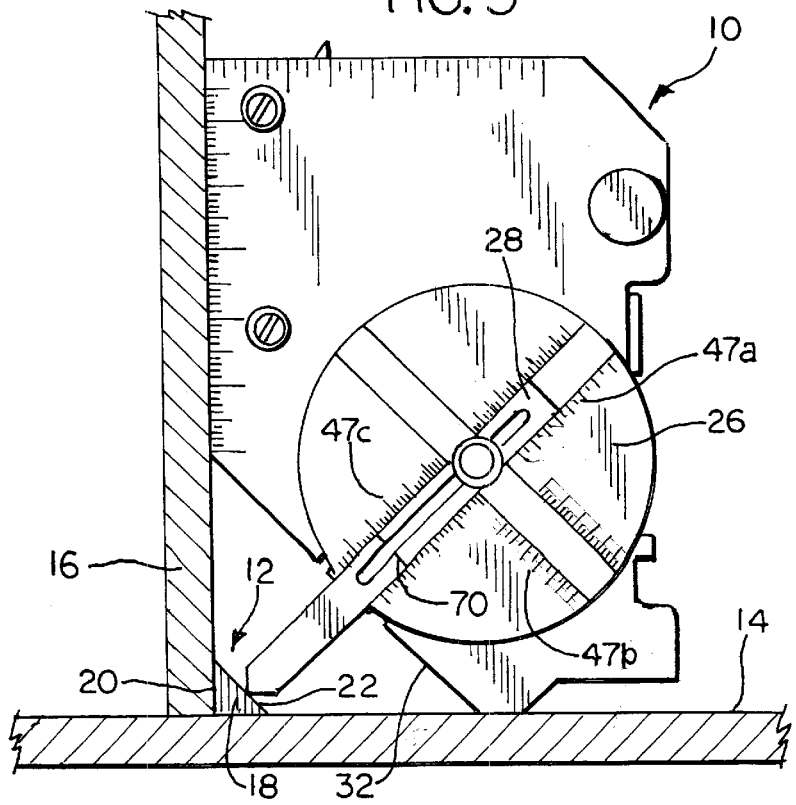
FIG. 6 is a perspective view of the gauge shown measuring the throat of a fillet weld using the theoretical scale.
Figure 7:
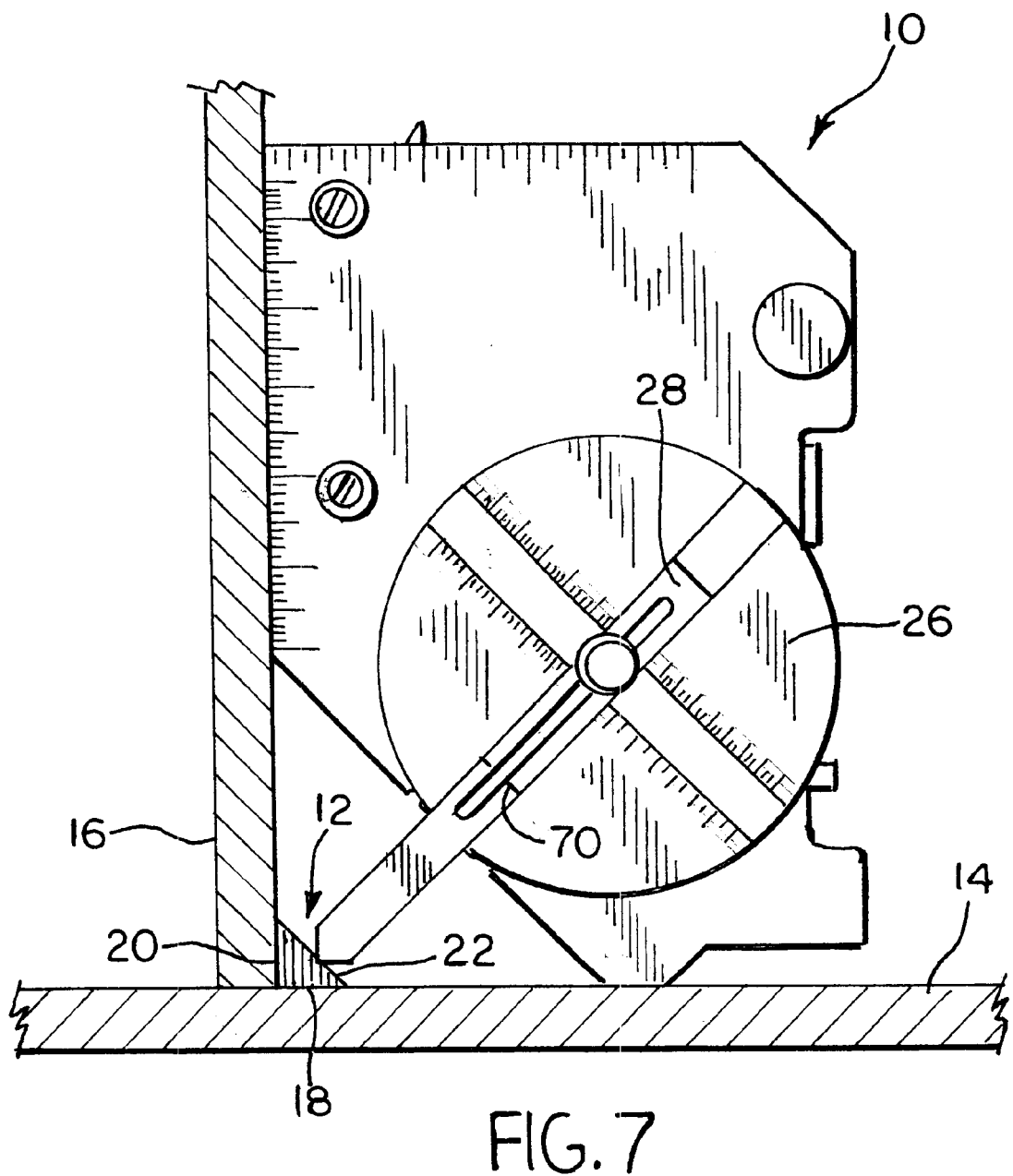
FIG. 7 is a perspective view of the gauge shown measuring the throat of a fillet weld using the metric scale.

The gauge 10 shown in FIGS. 1–7 is normally used to measure the dimension of the throat of a fillet weld 12, which joins two structural members 14, 16, positioned at right angles to one another. As shown in FIGS. 5, 6 and 7, weld 12 includes two legs 18, 20 and a throat 22.

Figure 1:
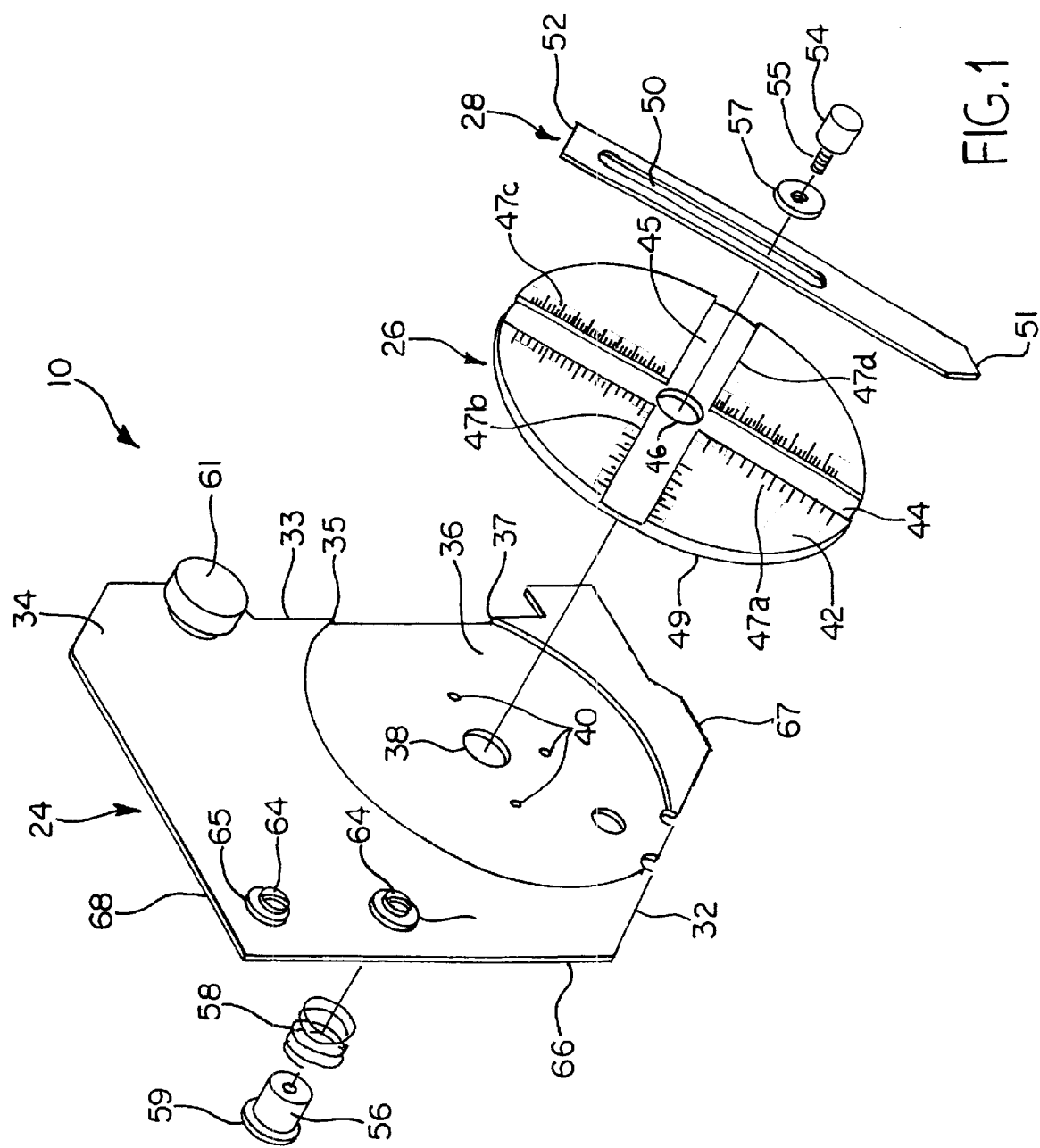
FIG. 1 is an exploded view of the gauge.
Figure 2:
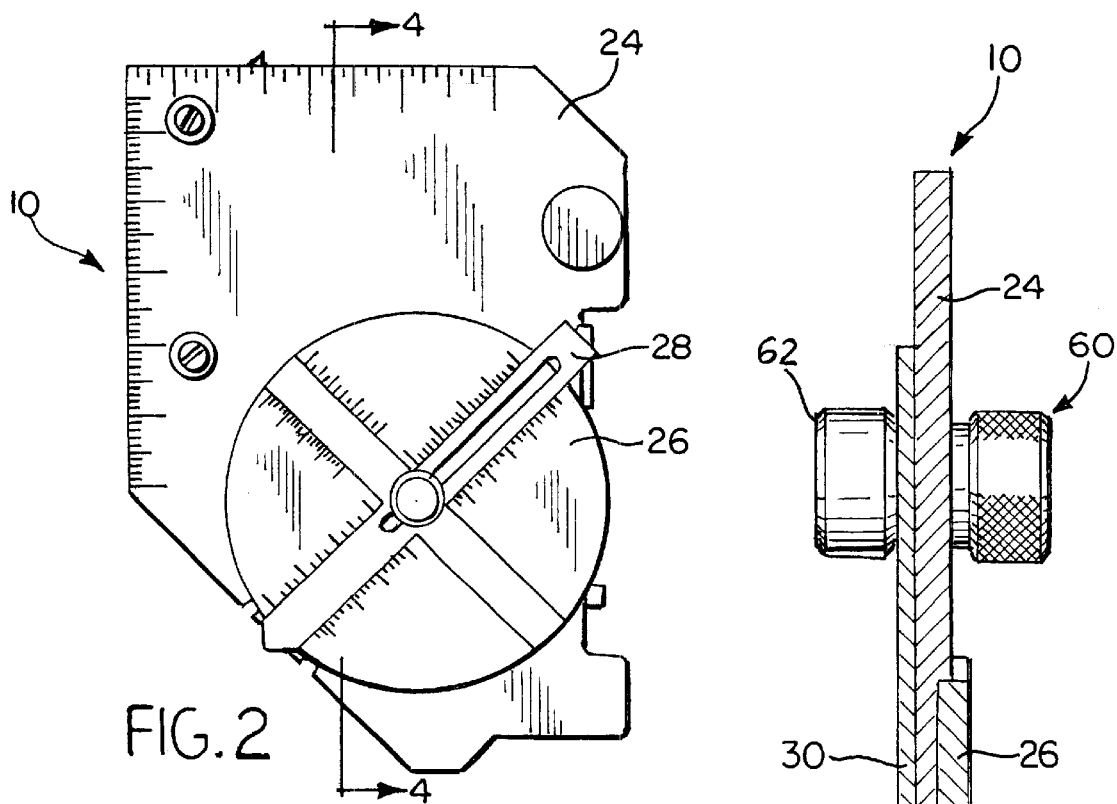
FIG. 2 is a top view of the gauge.
Figure 3:
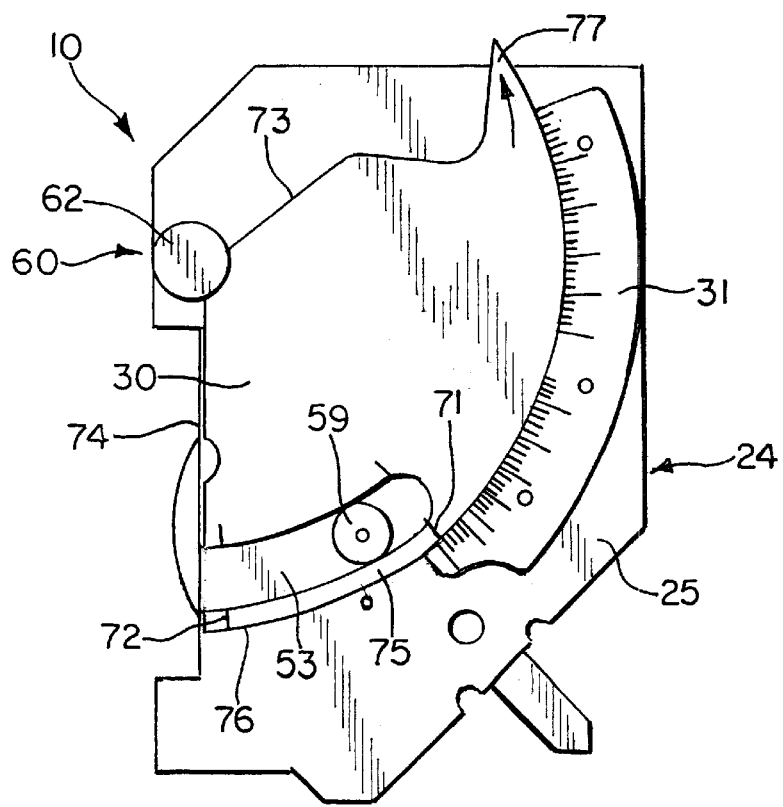
FIG. 3 is a rear view of the gauge.
Figure 4:
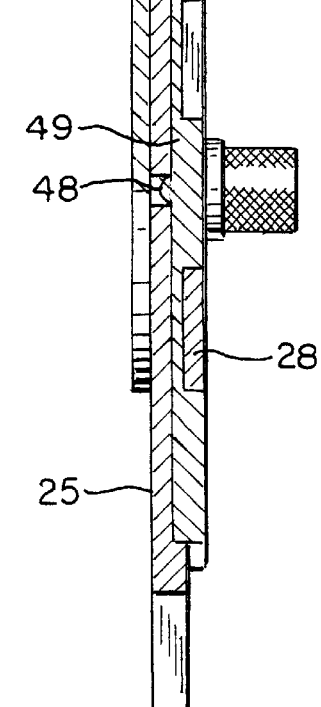
FIG. 4 is a sectional view taken along the line of 4—4 of FIG. 2.

Gauge 10 included a plate shaped body member 24, a circular plate member 26, a linear member 28, and a generally pie shaped plate member 30, as best shown in FIG. 3. As seen in FIG. 1, plate shaped body member 24 is partly defined by edges 32, 33, 66, 67, and 68 and is generally rectangular in shape, but has one corner section severed therefrom in a miter cut fashion by edge 32. Plate shaped body member 24 has a front face 34 having a generally circular recess 36 formed therein. Also located in body member 24 is axis hole 38 and detent apertures 40. In the preferred embodiment, recess 36 extends to corner edge 32 and into a longitudinal edge 33 of body number 24 so that edge 33 severs the circular geometry of recess 36 in a cord like fashion, wherein said cord is defined by points 35 and 37 on the circumference of circular recess 36.

Circular plate member 26 has an axial hole 46 centrally located and a first face 42 having two linear grooves 44 and 45 thereon. Linear grooves 44 and 45 are aligned along diameters of circular member 26 and intersect one another in a perpendicular manner thereby forming four radial groove portions 47a, 47b, 47c, and 47d. In the preferred embodiment, three separate scales of measurement are placed along radial groove portions 47a, 47b, and 47c. Along radial groove portion 47a a British or inches scale is marked. Along radial groove portion 47b a theoretical scale is provided; the theoretical scale being in inches along one side of groove portion 47b and then metric along the other edge of radial portion 47b. The theoretical scale provides a value of weld throat thickness 22, which includes an estimated value for weld penetration into structural members 14 and 16. The penetration increases the effective strength and thickness of weld 12. The metric scale is laid out along radial groove portion 47c. In the preferred embodiment no scale is laid out along radial groove portion 47d, but obviously any desired scale could be used along this radial groove portion. A bulbous protrusion 48 is located on face 49 of circular plate 26 opposite face 42.

Linear member 28 has a flat end 52, an opposite pointed end 51 and a linear slot 50 there between. The linear slot 50 extends coincident with linear member 28 and extends in close proximity to flat end slot 52, and is more distal from the opposite pointed end 51.

Pie shaped plate number 30 is defined by sector line 74 and partial sector line 73, and includes a pointed section 77 jutting beyond partial sector line 73. An arcuate slot 53 terminates at sector line 74 such that slot 53 defines arcuate portion 75 of plate 30, which is located between slot 53 and the circumferential edge 76, such that said portion 75 is uniform in width along the length of slot 53. A back face 25 of body member 24 has an arcuate scale 31 attached thereto with screws 64 and washers 65.

Having described the major parts of gauge 10, the assembly and parts for assembly will now be detailed. In the preferred embodiment, circular plate 26 is positioned within recess 36 such that a second face 49 of circular plate 26 is juxtaposed with body member 24. Linear member 28 is positioned within either linear groove 44 or linear group 45 of circular plate 26 and can slide in and alternate there between. Body member 24, circular plate 26 and linear member 28 are rotatably held together with a knurled knob 54 having a threaded screw 55 attached thereto wherein said threaded screw extends through linear slot 50 of linear member 28, axial hole 46 in circular plate 26, and axial hole 38 in body member 24 and is engagingly threaded into circular nut 56. A nylon washer 57 is placed between knurled knob 54 and linear plate member 28. A coiled spring 58 is compressed between an extended head 59 of circular nut 56 and back face 25 of body member 24.

Pie shaped plate 30 is rotatably mounted at 60 and juxtaposed adjacent a rear face 25 of body member 24 such that circular nut 56 is positioned within slot 53 of plate 30 and remains in slot 53 as plate 30 is rotated. Rotational mount 60 is accomplished in the preferred embodiment using a knurled knob 61 having a threaded screw (not shown) attached thereto that extends through an aperture (not shown) in plate 30 at point 60 and an aperture (not shown) in plate 24 at point 60 which is engagingly threaded to a knurled nut 62. Other suitable rotational mounts such as a rivet may be used to join body member 24 and pie shape 30.

Having described parts and assembly of weld gauge 10, the operation will now be discussed. For measuring the throat of 22 fillet weld 12, circular plate 26 and linear member 28 are utilized. Circular plate 26 is rotated within recessed 36 until the desired scale on radial segment 47a, 47b or 47c is aligned perpendicular to severed edge 32. Circular plate 26 is rotated by pushing the head 59 of circular nut 56 which causes coil spring 58 to become further compressed and thereby raising knob 54 slightly above linear member 28. This allows circular member 26 to freely rotate within recess 36. As the desired scale 47a, 47b, or 47c is aligned with edge 32, bulbous protrusion 48 will encounter the appropriate detent aperture 40. Circular nut 56 is then released and tension from coil spring 58 will firmly hold protrusion 48 within aperture 40 to lock the gauge 10 in the desired position.

Linear member 28 is rotated to the proper position within linear groove 44 or 45 by also pressing circular nut 56 against the face 25 of body member 24 compressing spring 58. As knob 24 is raised linear member 28 is free to rotate. Linear member 28 will be rotated such that point end 51 is aligned within or protruding radially outward from the radial segment 47a, 47b or 47c which is aligned perpendicular to edge 32.

To measure the throat 22 of fillet weld 12, circular nut 56 is pressed against face 25 of body member 24 and/or knob 54 is turned slightly to loosen threaded screw 55 within circular nut 56 thereby allowing linear member 28 to slide freely within the appropriate linear groove 44 or 45. Gauge 10 is then placed such that edge 66 of body member 24 firmly contacts structural member 16 and edge 67 of body member 24 is in firm contact with structural number 14 such that edge 32 faces fillet weld 12. Linear member 28 is then extended toward fillet weld 12 until point 51 touches throat 22 as can be seen in FIGS. 5–7. Once point 51 is contacted with throat 22, knob 54 is tightened and/or nut 56 is released to prevent further movement of linear member 28. The dimension of throat 22 is then read from the appropriate scale on radial segment 47a, 47b or 47c as indicated by the position of measuring line 70 on linear member 28. It should be appreciated that the knurled knob has three separate functions; first it allows the circular plate to be movable within its associated opening 36, between its detented positions. Secondly, it allows the linear member 28 to be moved or fixed relative to its associated grooves 44, 45; and finally, it allows the linear member 28 to be linearly slidable towards and away from the edge 32 within the associated grooves 44, 45.

Pie shaped plate 30 can be used to measure weld undercut, weld reinforcement, fillet leg length, angle of preparation, and misalignment; however, these uses of plate 30 are known and therefore will not be described in great detail. The basic operation of plate 30 involves rotation at point 60 whereby point 52 comes in contact with the element to be measured. When contact is obtained, the desired dimension can be read by the alignment of line 71 and 72 on plate 30 with the scale 31. Line 71 aligns with a British or inch scale and line 72 aligns with the metric scale.

It should also be appreciated that this invention may be carried out using only one plate member or base portion having at least one groove located in the plate and a linear member for sliding in the groove the measure the throat of a fillet member. For example, the base portion could be shaped substantially in an octagon shape such that two edges of the octagon would be held in firm contact with the structural members joined by the fillet weld and the groove would be located such that it terminates perpendicular to an edge of the octagon between the edges contacting the structural members. The linear member would be mounted in the slidable and/or rotational mount with said base portion as described above or other methods which are well known in the art.

Those skilled in the art will appreciate that the conception, upon which this disclosure is based, may be readily used as a basis for designing other structures, methods, and systems for carrying out several purposes of the present invention. Further, the abstract is neither an attempt to define the invention of the application which is measured by the claims, neither is it intended to limit the scope of the invention in any way.

The preferred embodiment herein described is not intended to be an exhaustive or to limit the invention to the precise forms enclosed. They are chosen and described to best explain the principals of the invention in its application and practical use to thereby enable other skilled in the art to utilize the invention.

What is claimed is:

1. A gauge for checking dimensions of welds comprising first and second plates which are rotatably mounted about an axis of rotation and juxtaposed to one another, a linear member rotatably mounted on the same axis of rotation as the first and second plates, and juxtaposed to the second plate on a first face of the second plate opposite the first plate, the linear member further being slidably mounted in relation to said first and second plates in order to extend to and measure a dimension of a weld, said second plate being substantially circular in shape, a front face on said first plate juxtaposed to a second face of said second plate wherein the front face has a recess therein sized to accommodate said second plate.

2. The gauges set forth in claim 1 further comprising a second linear groove on the first face of the second plate juxtaposed the linear member and set at an angle to the first groove for purposes of sliding the linear member therein and measuring the dimensions of the weld using an alternative scale.

3. The gauge as set forth in claim 2, wherein the first and second linear grooves are cruciform in shape.

4. The gauge as set forth in claim 3, wherein the first and second plates include a detent mechanism, allowing detented position of said first and second plates relative to each other.

5. The gauge as set forth in claim 4, wherein the detented positions coincide at positions wherein said first and second linear grooves are perpendicular to a traversed edge of the first plate.

6. A gauge for checking throat dimensions of a fillet weld comprising a base portion having opposite first and second faces, a linear slide member rotatably mounted to said base portion of said first place and linearly slidable along said base portion to measure the throat of a fillet weld, a third plate rotatably mounted to the base potion on said second face, said base portion, said first plate, and said linear member being mounting upon a common axis.

7. The gauge as set forth in claim 6 further comprising at least two grooves in a first face of the base portion for sliding the linear member therein.

8. The gauge as set forth in claim 7, wherein the grooves are located in a cruciform manner in the first face of the base portion and terminate at edges of the base portion.

9. The gauge as set forth in claim 8, wherein the linear member has a linear slot to facilitate sliding in the grooves.

10. The gauge as set forth in claim 9, wherein said first plate includes a recess sized to accommodate said base portion so that the base portion may rotate therein.

11. A gauge for checking dimensions of welds comprising first and second plates which are rotatably mounted about an axis of rotation and juxtaposed to one another, a linear member rotatably mounted on the same axis of rotation as the first and second plates, and juxtaposed to the second plate on a first face of the second plate opposite the first plate, the linear member further being slidably mounted in relation to said first and second plates in order to extend to and measure a dimension of a weld, said second plate being substantially circular in shape, said second plate having a first linear groove on the first face juxtaposed to the linear member and sized to accommodate the linear member for sliding therein.

12. A gauge for checking dimensions of welds comprising first and second plates which are rotatably mounted about an axis of rotation and juxtaposed to one another, a linear member rotatably mounted on the same axis of rotation as the first and second plates, and juxtaposed to the second plate on a first face of the second plate opposite the first plate, the linear member further being slidably mounted in relation to said first and second plates in order to extend to and measure a dimension of a weld, said first and second plates experiencing only rotational movement relative to each other.

* * * * *